Patented Aug. 11, 1942

2,292,691

UNITED STATES PATENT OFFICE 2,292,691

FLUORANTHENE DERIVATIVES AND PROCESS OF PREPARING SAME

Walter Kern, Sissach, and Theodor Holbro and Richard Tobler, Riehen, Switzerland, assignors to the firm Society of Chemical Industry in Basle, Basel, Switzerland No Drawing. Application August 22, 1939, Serial No. 291,427. In Switzerland August 27, 1938

8 Claims. (Cl. 260—465)

This invention relates to the manufacture of fluoranthene nitriles or carboxylic acids by converting in known manner into cyano-groups or exchanging in known manner for cyano-groups at least 2 halogen atoms or at least two amino-groups existing as nuclear substituents in a fluoranthene and when a carboxylic acid is required saponifying the nitrile thus obtained to produce the carboxylic acid; if desired the product thus obtained is treated with an agent introducing a substituent.

Parent materials for the invention are for example diaminofluoranthenes, for instance 4:12-diaminofluoranthene and halogenfluoranthenes, for instance tri- or tetrachloro- or bromofluoranthene and especially the dihalogenfluoranthenes, for instance 4:12-dibromofluoranthene. In the fluoranthenes containing at least two amino-groups as nuclear substituents, these substituents may be converted into cyano-groups by tetrazotizing the diaminofluoranthene and subjecting the tetrazo compound produced to the Sandmeyer process, for example causing it to react with a solution of potassium cuprous cyanide. In the case of the halogen fluoranthenes, for instance 4:12-dibromofluoranthene the halogen atoms may be exchanged for cyano-groups by causing the compounds to react in presence or absence of a suitable solvent or diluent, for instance nitrobenzene or naphthalene with cuprous cyanide, if desired in presence of benzylcyanide. The fluoranthene-dinitriles and polynitriles obtainable in this manner are valuable intermediate products for the manufacture of dyestuffs. They can be converted by treatment with saponifying agents, for instance an acid or preferably an alkaline saponifying agent into the corresponding carboxylic acids. Suitable saponifying agents for this purpose are for example sulfuric acid and especially alkali solution, if desired in the presence of an alcohol; the saponification is advantageously conducted at a high temperature.

The fluoranthene carboxylic acids thus obtained are also valuable intermediate products. From the products thus obtained, for example the aforesaid fluoranthene carboxylic acids, further valuable products, for instance halogen fluoranthenedicarboxylic acids and polycarboxylic acids may be made by treating the product with a substituting agent, for example, a halogenating agent such as bromine, chlorine or sulfuryl, chloride, preferably in the presence of a halogen carrier, for instance iodine.

It is to be noted that the positions of the substituents in the fluoranthene nucleus are not exactly known. Therefore, in the following examples and in the appended claims no positions are indicated.

The following examples illustrate the invention, the parts being by weight:

Example 1

36 parts of dibromofluoranthene of melting point 204–205° C. obtainable by brominating fluoranthene in nitrobenzene are heated to 300° C. Into the melted mass there are introduced, while stirring, and in the course of ½ hour 20 parts of cuprous cyanide. Heating is now continued for another ¼ hour at 320–330° C. and then the melt is poured out and allowed to cool. The dark brittle mass is powdered and introduced into boiling nitric acid of 20 per cent strength. When all the copper compounds have dissolved the whole is filtered and the solid matter washed and dried. The dicyanofluoranthene thus obtained in good yield is a yellow-green powder which melts at 305–310° C.

The same product is obtained by the reaction of dibromofluoranthene with cuprous cyanide in boiling benzylcyanide.

The same product is also obtained with smaller yield when using dichlorofluoranthene instead of dibromofluoranthene.

Example 2

22 parts of dicyanofluoranthene obtained as described in Example 1 and a solution of 40 parts of potassium hydroxide in 300 parts of ethyl alcohol of 90 per cent strength are stirred together in an autoclave at 175–185° C. for 10 hours. The product of this saponification is taken up in water, then boiled with animal charcoal and filtered and the filtrate is acidified with hydrochloric acid. The fluoranthenedicarboxylic acid thus precipitated is filtered, washed and dried. It is a greenish powder which decomposes at 400° C. The yield is very good.

Example 3

To a solution of 58 parts of fluoranthenedicarboxylic acid and 0.5 part of iodine in 580 parts of chlorosulfonic acid there are added by drops at 0–5° C. and while stirring, 67 parts of bromine. After 10 hours the cooling device is removed and after 15 hours 1160 parts of sulfuric acid are gradually added at 0–5° C. to decompose the chlorosulfonic acid. The whole is now stirred into ice and then filtered to separate the dibromofluoranthenedicarboxylic acid which has been precipitated; the precipitate is washed and dried. It is a yellowish powder and melts at 350° C. while decomposing.

In an analogous manner mono-bromofluoranthenedicarboxylic acid may be obtained when using about half the quantity of bromine, or dichlorofluoranthenedicarboxylic acid when using equivalent amounts of chlorine or sulfuryl chloride.

*Example 4*

22 parts of tribromofluoranthene of melting point 202-203° C. obtainable by brominating dibromofluoranthene in nitrobenzene at 90-95° C. and 15 parts of cuprous cyanide are added to 200 parts of benzyl cyanide and the whole is heated to boiling for 2 hours. The mass is filtered hot by suction and the solid matter washed with some benzyl cyanide and alcohol and introduced into boiling nitric acid of 20 per cent strength. When all the copper compounds have dissolved the mass is filtered and the solid matter washed and dried. The tricyanofluoranthene thus obtained is a greenish powder which melts with decomposition at 420° C.

The acid obtained from the nitrile by saponification with alcoholic potash solution is a yellow-brown powder which melts with decomposition at 300° C.

*Example 5*

15.25 parts of diaminofluoranthene obtainable by the reaction of dibromofluoranthene with ammonia of 30 per cent strength in an autoclave at 170-180° C. in the presence of cuprous chloride are suspended in the form of the hydrochloride in 200 parts of hydrochloric acid of 10 per cent strength and then tetrazotized by the addition of a solution of 10 parts of sodium nitrite in 50 parts of water at 0° C. until no more nitrous acid is consumed. The solution thus obtained is filtered and added in small portions to a solution of potassium cuprous cyanide and heated to 60-70° C. The precipitate thus obtained is filtered and extracted with dilute boiling caustic soda solution and finally with nitric acid of 20 per cent strength to remove copper compounds. The crude dicyanofluoranthene thus obtained is saponified as described in Example 2 whereby the same fluoranthenedicarboxylic acid is produced in a somewhat less pure condition.

What we claim is:

1. Process for the manufacture of fluoranthene derivatives, comprising heating at least to about 210° C. fluoranthenes which contain at least two halogen atoms as nuclear substituents, with cuprous cyanide.

2. Process for the manufacture of fluoranthene derivatives, comprising heating at least to about 210° C. fluoranthenes which contain at least two halogen atoms as nuclear substituents, with cuprous cyanide in the presence of indifferent solvents.

3. Process for the manufacture of fluoranthene derivatives, comprising heating at least to about 210° C. fluoranthenes which contain at least two bromine atoms as nuclear substituents, with cuprous cyanide.

4. Process for the manufacture of fluoranthene derivatives, comprising reacting molten dibromofluoranthenes with cuprous cyanide.

5. Substituted fluoranthenes having at least two identical nuclear substituents selected from the group consisting of CN and COOH in at least the position 4 and in one of the positions 11 and 12.

6. Substituted fluoranthenes having two identical nuclear substituents selected from the group consisting of CN and COOH in 4-position and in one of the positions 11 and 12.

7. Dibromofluoranthenedicarboxylic acid melting at about 350° C. with decomposition containing the carboxyl groups in 4-position and in one of the positions 11 and 12.

8. Fluoranthenedicarboxylic acid which decomposes at about 400° C. containing the carboxyl groups in 4-position and in one of the positions 11 and 12.

WALTER KERN.
THEODOR HOLBRO.
RICHARD TOBLER.